(12) United States Patent
Chilimbi et al.

(10) Patent No.: US 8,065,565 B2
(45) Date of Patent: Nov. 22, 2011

(54) STATISTICAL DEBUGGING USING PATHS AND ADAPTIVE PROFILING

(75) Inventors: Trishul Chilimbi, Seattle, WA (US); Krishna Kumar Mehra, Kolkata (IN); Benjamin Robert Liblit, Madison, WI (US); Aditya V. Nori, Bangalore (IN); Kapil Vaswani, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 12/245,581

(22) Filed: Oct. 3, 2008

(65) Prior Publication Data

US 2010/0088546 A1    Apr. 8, 2010

(51) Int. Cl.
*G06F 11/00*    (2006.01)
(52) U.S. Cl. .................. 714/38.1; 714/25; 714/47.1
(58) Field of Classification Search ................ 714/25, 714/38, 45, 38.1, 47.1
See application file for complete search history.

(56) References Cited

U.S. PATENT DOCUMENTS

| | | | |
|---|---|---|---|
| 6,938,186 | B2 | 8/2005 | Das et al. |
| 7,140,008 | B2 | 11/2006 | Chilimbi et al. |
| 2005/0091646 | A1 | 4/2005 | Chilimbi et al. |
| 2006/0059390 | A1 | 3/2006 | Duron et al. |
| 2007/0055914 | A1* | 3/2007 | Chandwani et al. ............ 714/47 |
| 2007/0079293 | A1* | 4/2007 | Wang et al. .................... 717/128 |
| 2008/0005208 | A1 | 1/2008 | Vaswani et al. |
| 2008/0126858 | A1* | 5/2008 | Barras ........................... 714/25 |
| 2009/0319621 | A1* | 12/2009 | Barsness et al. .............. 709/206 |

OTHER PUBLICATIONS

Chilimib et al., "Low-Overhead Memory Leak Detection Using Adaptive Statistical Profiling," http://64.233.183.104/search?q=cache:vL3hUIP3ojAJ:www-plan.cs.colorado.edu/~hauswirt/Research/asplos04.pdf+statistical+debugging+using+paths+and+adaptive+profiling&hl=en&ct=clnk&cd=1&gl=in.
Ammons et al., "Improving Data-Flow Analysis with Path Profiles," ACM 1998, http://www-plan.cs.colorado.edu/diwan/7135/p72-ammons.pdf.
Ball et al., "Optimally Profiling and Tracing Programs," Association for Computing Machinery, Inc., 1994, http://citeseer.ist.psu.edu/cache/papers/cs/5138/http:zSzzSzwww.bell-labs.comzSz~tballzSzpaperszSzoptproftrace.pdf/ball94optimally.pdf.
Gupta et al., "Locating Faulty Code Using Failure Inducing Chops," ACM, 2005, http://www.cs.ucr.edu/~gupta/research/Publications/Comp/ase05.pdf.
Chen et al., "Path-Based Failure and Evolution Management," http://research.microsoft.com/~emrek/pubs/paths-nsdi.pdf.
Nagpurkar et al., "Phase-Aware Remote Profiling", www.cs.ucsb.edu/~ckrintz/papers/cgo05.pdf.
"Software Artifact Infrastructure Repository"; downloaded May 13, 2008; http://sir.unl.edu/portal/index.html.

(Continued)

*Primary Examiner* — Joshua Lohn
*Assistant Examiner* — Sarai Butler

(57) ABSTRACT

The method executes the application and if there are no errors from the execution of the application, the method ends. If errors exist, the errors are collected from the execution of the application in an error report. Labeled application paths are created by adding a unique label to individual application paths where the application paths are individual loops and individual functions in the application. An analysis is created of the labeled application paths by executing the application with the labeled paths, reviewing the error report for data related to the labels and if an error is sufficiently related to application paths with labels, storing the path that created the errors in a report. If an error is not sufficient related to the application path with labels, the method is repeated by the creating the analysis again by substituting additional application paths for the application paths.

20 Claims, 3 Drawing Sheets

OTHER PUBLICATIONS

Arnold, M. et al.; "A Framework for Reducing the Cost of Instrumented Code*"; SIGPLAN Not.; vol. 36, No. 5; 2001; pp. 168-179.

Ball, T. et al.; "Efficient Path Profiling"; Proceedings of the 29th Annual International Symposium on Microarchitecture; 1996; Paris, France; pp. 46-57.

Ball, T. et al.; "From Symptom to Cause: Localizing Errors in Counterexample Traces"; SIGPLAN Not.; Jan. 2003; pp. 97-105.

Chilimbi, T.M. et al.; "HOLMES: Effective Statistical Debugging via Efficient Path Profiling"; Proceedings of the International Conference on Software Engineering (ICSE); May 2009; Association for Computing Machinery, Inc.

Cleve, H. et al.; "Locating Causes of Program Failures"; ICSE'05; May 15-21, 2005; St. Louis, Missouri.

Hirzel, M. et al.; "Bursty Tracing: A Framework for Low-Overhead Temporal Profiling"; 4th ACM Workshop on Feedback-Directed and Dynamic Optimization; 2001.

Jones, J.A. et al.; "Empirical Evaluation of the Tarantula Automatic Fault-Localization Technique"; Proceedings of the 20th IEEE/ACM International Conference on Automated Software Engineering; Nov. 2005; Long Beach, California; pp. 273-282.

Jones, J.A. et al.; "Visualization of Test Information to Assist Fault Localization"; Proceedings of the 24th International Conference on Software Engineering; May 2002; Orlando, Florida; pp. 467-477.

Liblit, B. et al.; "Bug Isolation via Remote Program Sampling"; PLDI'03; Jun. 9-11, 2003; San Diego, California.

Liblit, B. et al.; "Scalable Statistical Bug Isolation"; PLDI'05; Jun. 12-15, 2005; Chicago, Illinois.

Liu, C. et al.; "SOBER: Statistical Model-based Bug Localization"; Proceedings of the European Software Engineering Conference and ACM SIGSOFT Symposium on the Foundations of Software Engineering; Sep. 2005; pp. 286-295.

Nainar, P.A. et al.; "Statistical Debugging Using Compound Boolean Predicates"; Proceedings of the 2007 International Symposium on Software Testing and Analysis; 2007; pp. 5-15.

Vaswani, K. et al.; "Preferential Path Profiling: Compactly Numbering Interesting Paths"; Proceedings of the 34th Annual ACM SIGPLAN-SIGACT Symposium on Principles of Programming Languages; 2007.

Zheng, A., et al.; "Statistical Debugging: Simultaneous Identification of Multiple Bugs"; ICML'06; 2006; ACM Press; New York, NY; pp. 1105-1112.

* cited by examiner

STATISTICAL DEBUGGING USING PATHS AND ADAPTIVE PROFILING

BACKGROUND

This Background is intended to provide the basic context of this patent application and it is not intended to describe a specific problem to be solved.

Commercial software ships with undetected bugs despite the combined best efforts of programmers, sophisticated program analysis tools that detect program errors, and extensive testing. When run with certain inputs, these undetected software errors cause crashes that are disruptive at best, and cost money and lives at worst. To fix the problem, a programmer often has to painstakingly try and work backwards from the crash to isolate and debug the root cause of the error. This process is tedious, error-prone, and involves guesswork as typically the only information available is the stack trace and register values at the point where the program crashed.

Statistical debugging aims to streamline and automate the process of isolating the bug responsible for the program crash. It achieves this goal by collecting information about program execution from both successful and failing runs of a program and applying statistical techniques to pinpoint the likely cause of the software crash.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of debugging an application using paths is disclosed. The method executes the application and if there are no errors from the execution of the application, the method ends. If errors exist, the errors are collected from the execution of the application in an error report. Labeled application paths are created by adding a unique label to individual application paths where the application paths are individual loops and individual functions in the application. An analysis is created of the labeled application paths by executing the application with the labeled paths, reviewing the error report for data related to the labels and if an error is sufficiently related to application paths with labels, storing the path that created the errors in a report. If an error is not sufficient related to the application path with labels, the method is repeated by the creating the analysis again by substituting additional application paths for the application paths.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
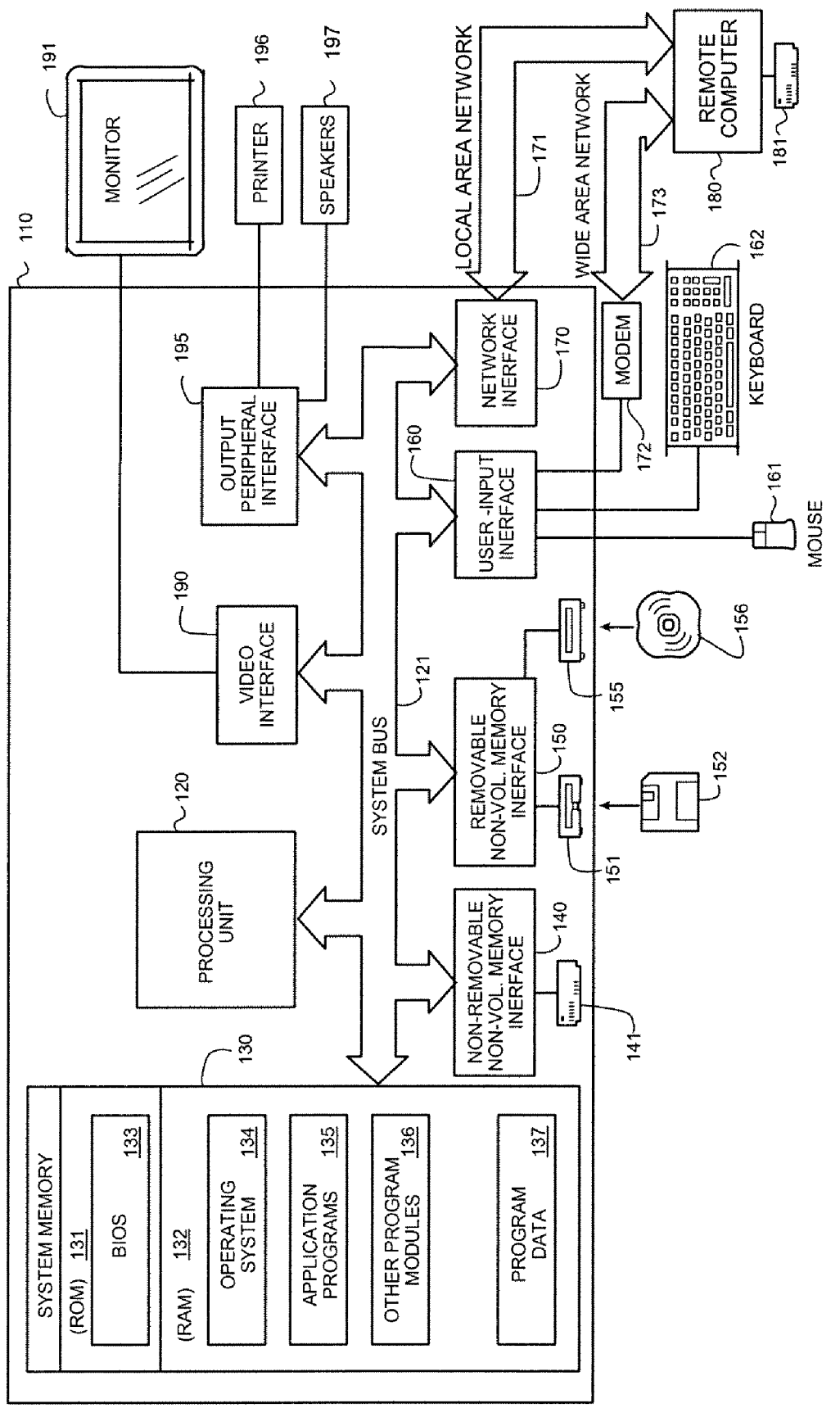
FIG. 1 is an illustration of a portable computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
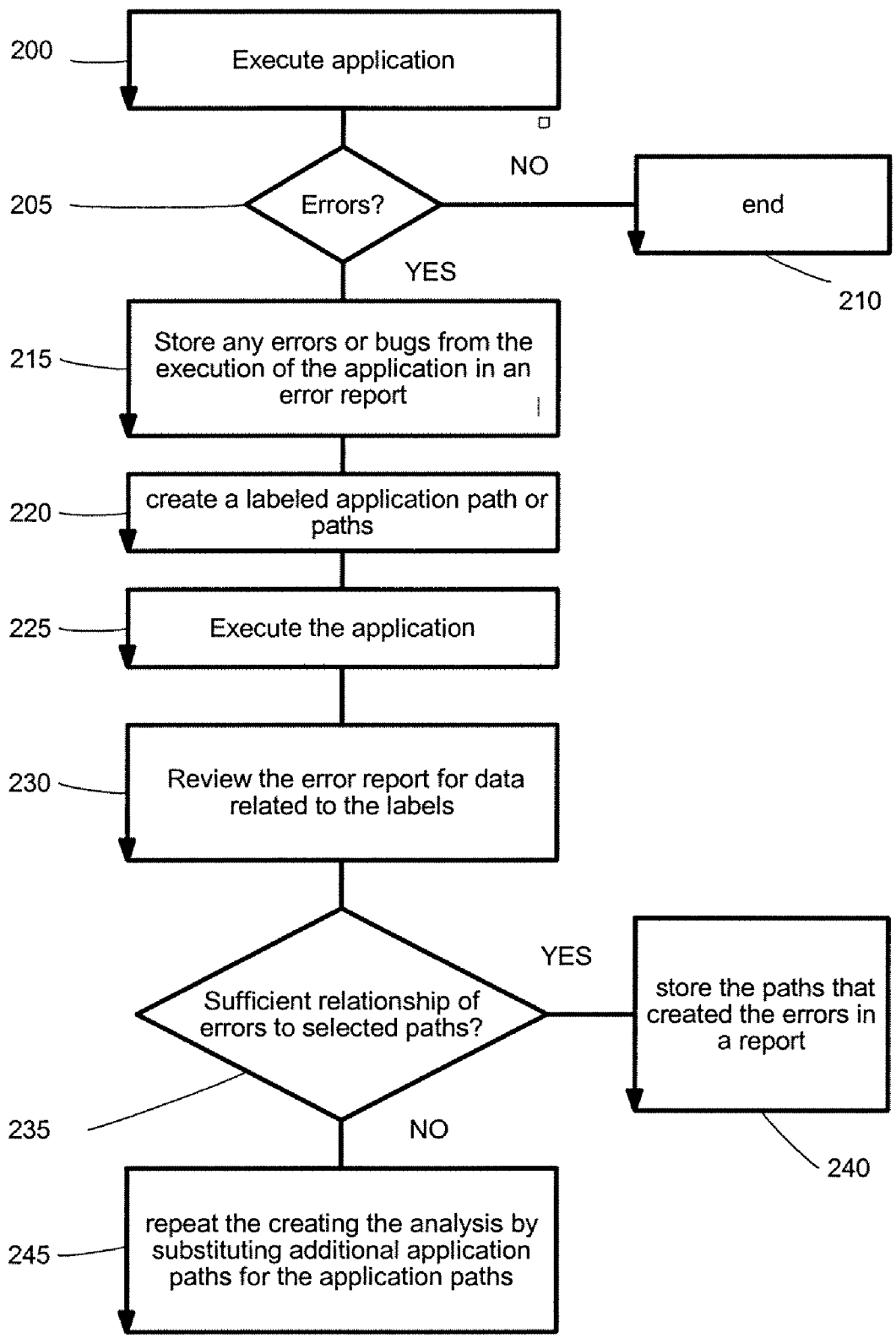
FIG. 2 is an illustration of a method of debugging an application using paths.
Figure 3:
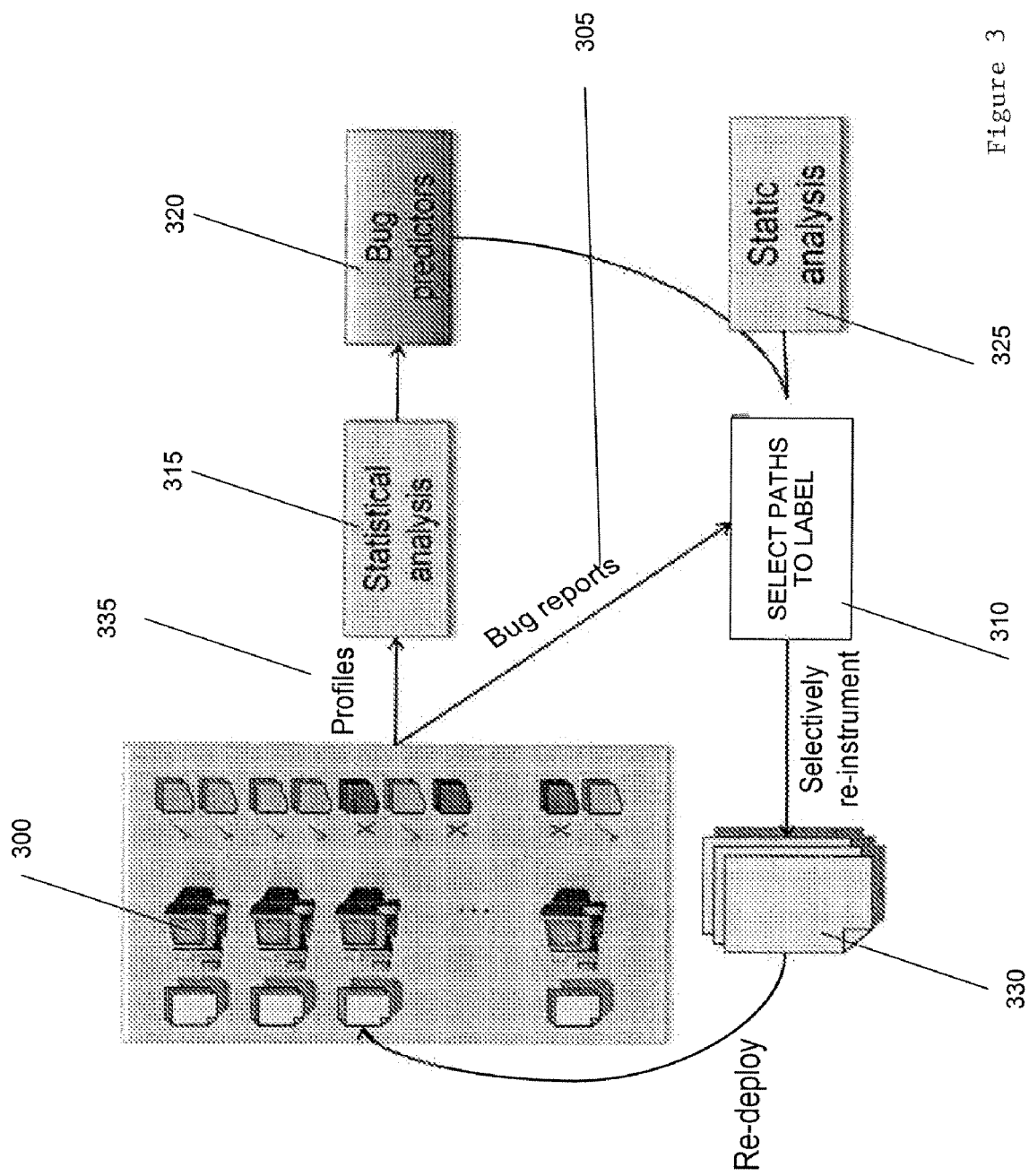
FIG. 3 is an illustration of the different elements of the application.

FIG. 2 illustrates a method of using paths and statistical analysis to debug an application that may be implemented on a computer system such as the system described in FIG. 1. Prior work on statistical debugging has not fully investigated the impact of using path profiles n the accuracy of bug isolation.

Paths are a likely candidate as they capture more information about program execution behavior than point profiles, such as predicate summary counters. In addition to the possibility of more precise bug isolation, paths offer two other advantages over predicates. While predicates can pinpoint the buggy code, paths can additionally provide context about how the buggy code was exercised. This information can aid and simplify debugging. Second, path (and edge) profiles are routinely collected in some systems for profile guided performance optimization. In such cases, statistical debugging can be performed with no additional program instrumentation or change to the software build process. While this may seem like a minor point, large software is often complied and tested with a brittle and complex build process that programmers are loath to change.

At block 200, the application 300 may be executed. The application 300 may be virtually any application 300. In some embodiments, there may be a plurality of applications 300 that are executed. In other embodiments, only part of the application 300 is executed.

At block 205, any errors or bugs from the execution of the application 300 may be stored in an error report 305. Errors in execution can happen for a variety of reasons and the interruptions from the error may have different effects. Bug reports 305 may be processed to gather information about program failures such as the type and location of the exception, the stack trace to the exception, number of active threads at the time of crash, memory consumption at the time of crash etc.

At block 210, if there are no errors, the method may end. In this approach, the overhead to a properly operating program will be minimal. In addition, there is little to be learned about errors from a properly operating application 300.

At block 215, if the determination at block 205 is true (there are errors), errors or bugs from the execution of the application 300 are stored in an error report 305. Errors are often caught by exception handlers, but they still are errors that hinder and slow the execution of the application. Other manners of catching errors are possible and are contemplated.

At block 220, a labeled application path 310 or paths 310 may be created. The labeled application path 310 may entail adding a unique label to each of the application paths. An application path 310 may be a discrete section of an application 300 such as an individual loops or an individual function in the application.

In some embodiments, not all application paths are labeled, but only application paths of interest. The initial selection of application paths 310 may occur in a variety of manners. In some embodiments, there may be prior knowledge that certain functions are troublesome so these may be labeled. In another embodiment, application paths 310 that are used just before error occurs are labeled. Other manners of identifying application paths 310 to be labeled are possible and are contemplated.

At block 225, an error analysis may occur. The analysis may be created in a variety of ways. In one embodiment, the application 300 may be executed again. In this execution, the paths of interest may have been labeled and any error reports may indicate the labeled application paths 310 that caused or is related to the error.

At block 230, the error report 305 for data related to the labels may be reviewed. The review may be tailored to the analysis being performed. In one embodiment, the error report 305 is reviewed for labeled application paths 310. Of course, the error reports 305 may be reviewed for other relevant data. The method attempt to identify the application paths 310 most likely to cause bugs or errors.

At block 235, it may be determined if a sufficient relationship exists between the errors relate to application paths 310 with labels. If no errors relate to the application paths 310, or the relationship is deemed to be weak, then the wrong application paths 310 may be labeled and additional application paths 310 may be selected at block 245.

In some embodiments, statistical debugging 315 may be used. Statistical debugging collects information about program execution from both successful and failing runs of a program and applies statistical techniques to pinpoint the likely cause of the software crash or to predict what caused a crash 320.

A program may be instrumented to collect data about the values of certain types of predicates at particular program points. There may be three categories of predicates tracked:

Branches: two predicates indicating whether the true or false branch was taken.

Returns: at each scalar returning function call site, six predicates, indicating whether the return value is $<0, <=0, >0, >=0, =0,$ or $<>0$.

Scalar Pairs: at each scalar assignment $x= \ldots$, the method identifies each same-typed in-scope variable $y_i$ and each constant expression $c_j$. For each $y_i$ and each $c_j$, six relationships were tracked to the new value of x: $<, <=, >, >=, =, <>$.

This information may then be aggregated across multiple runs of a program in the form of feedback reports. The feedback report or bug report 305 for a particular program execution may be formed as a bit-vector, with two bits for each predicate (observed and true), and one final bit representing success or failure. In the next step, the predicates may assign numeric scores to identify the best predictor 320 from the set of predicates.

As part of bug prediction 320, predictors are scored based on sensitivity (accounts for many failed runs) and specificity (does not mis-predict failure in successful runs). Assigning scores solely based on sensitivity will result in super-bug predictors 320, which include failures from more than one bug. Super-bug predictors 320 are highly non-deterministic, as they are not specific to any single cause of failure, and rarely provide useful debugging information.

Scoring predicates based on specificity alone instead results in sub-bug predictors 320. A sub-bug predictor 320 accounts for a portion of the failures caused by a bug, but not all. Unlike super-bug predictors 320, sub-bug predictors 320 that account for a significant sub-set of failures may be useful in debugging, although perfect predictors 320 are of course preferred.

Sensitivity and specificity are balanced using a numeric Importance score computed as follows. The truth values of a predicate p from all the runs can be aggregated into four values: S(p obs) and F(p obs), respectively the number of successful and failed runs in which the value of p was evaluated, and S(p) and F(p), respectively the number of successful and failed runs in which the value of p was evaluated and was found to be true. Using these values, two scores of bug relevance may be calculated:

Sensitivity: Recall(p) defined as

Recall(p)=log F(p))/log (NumF)

where NumF is the total number of failing runs. A good predictor 320 hopefully will predict a large number of failing runs.

Specificity: Increase (p). The amount by which p being true increases the probability of failure over simply reaching the line where p is defined. It is computed as follows:

Increase(p)=(F(p)/S(p)+F(p))−F(p obs)/(S(p obs)+F(p obs))

Taking the harmonic mean combines these two scores, identifying predicates that are both highly sensitive and highly specific:

Importance(p)=2/((1/Increase(p))+(1/Recall(p)))

The Importance score may be calculated for each predicate and the top result may be selected. It is assumed that this predictor 320 corresponds to one important bug 305, though other bugs may remain. This top predictor 320 may be recorded, and then all feedback reports where it was true are removed from consideration under the assumption that fixing the corresponding bug 305 will change the behavior of runs in which the predictor 320 originally appeared. The scores are recalculated for all remaining predicates in the remaining sets of runs. The next best predictor 320 among the remaining reports 305 is then identified, recorded, and removed in the same manner. This iterative process may terminate either when no undiagnosed failed runs remain, or when no more failure-predictive predicates 320 can be found.

This process of iterative elimination maps each predictor 320 to a set of application or program 300 runs. Ideally, each such set corresponds to the expression of a distinct bug 305; unfortunately this is not always the case. Due to the statistical nature of the analysis, along with incomplete feedback or bug reports 305 resulting from sparse sampling rates, a single bug 305 may be predicted 320 by several top-ranked predicates, and predictors 320 for less prevalent bugs may not be found at all. The output of the analysis may be a list of predicates that had the highest score during each iteration of the elimination algorithm, as well as a complete list of predicates and their scores before any elimination is performed.

The pending application uses paths 310 instead of predicates to perform bug isolation. In the case of paths 310, the values S(path obs) and S(path) as computed as follows. S(path obs) is set to 1 if in a successful run of the program if the node corresponding to the start of the path 310 was visited. A path is said to have been observed when the node that corresponds to the start of the path is visited but the path is not necessarily executed. S(path) is set to 1 if that path 310 was traversed in a successful run of the program. F(path obs) and F(path) are computed analogously for failing program runs. These values may then used to compute the importance score for the path 310 using the same formula used for predicates.

The use of paths 310 in place of predicates enables the method to precisely isolate errors 305 that require correlating multiple predicates, which would otherwise be tracked independently. In addition, paths 310 provide more context than predicates about how the buggy code was exercised. This information is often invaluable to a programmer during debugging. Using paths 310 is sometime known as the Frost approach.

In order to bootstrap the process of finding the root cause of errors 305, the method may exploit the common knowledge that often, the root cause of bugs 305 can be found in functions present on the stack trace at the point of failure. Based on this assumption, some embodiments of the method may process bug reports 305 to compute a set S of functions that appear in one or more stack traces. All functions in this set are candidates for instrumentation. However, to control the number of functions in this set, the method may compute an effective score ES(f) for each function f 2 S defined as follows.

$$ES(f) = \sum_{i=1}^{N} \frac{1}{distance_i(f)}$$

where N is the number of bug reports 305 and distance i(f) is the number of functions that lie between the function f and the function containing the location of failure in the stack trace of bug report i 305. Intuitively, ES(f) is high for functions that appear often on the stack trace and/or appear close to the location of failure. The method may select the top k functions from the set S based on this score for profiling in the next iteration (in other words, these k functions are selected for instrumentation), where k is a user-defined threshold that can be used to control the overheads of profiling. In case there are no stack traces, the method may bootstrap using full fledge profiles 335. Of course, other ways of analyzing the labeled application paths are possible and are contemplated.

At block 240, the paths 310 that created the errors 305 in a report may be stored. At block 245, the method may be repeated by substituting additional application paths 310 for the application paths 310. The method may select the additional paths 310 to be reviewed as described previously or by any other useful manner.

For example, intuition holds that if a piece of code correlates with failures 305, then parts of code that are strongly coupled with this piece of code are also likely to correlate with failures 305. This information is may be used to adaptively extend the search for a stronger root cause. Statistical analysis 315 may be used to process profiles and identify potential root causes. Data may be collected by deploying an instrumented version (paths are labeled) of the application 300 and collecting bug reports 305 and profiles 335, if any, from all executions of this instrumented version of the program 300. After the bug reports 305 are obtained, profiles 335 may be collected and analyzed for all runs since the last iteration using a statistical engine 315. The analysis may return a set of bug predictors 320, their scores, the set of failing runs each predictor 320 explains and a set of unexplained failures. The predictor 320 may be classified as strong if the predictor's 320 score exceeds a user-defined threshold and weak otherwise. All strong predictors 320 may be marked as potential root causes and reported to the developer. If all failing runs are explained by strong predictors 320, the iterative process may be reinitialized by deploying an uninstrumented version of the program 300, after which it may need to be bootstrapped again. On the other hand, any weak predictors 320 are passed to the function selection phase, which may use them to identify the next set of functions 310 to be profiled.

At the function selection, a set of weak predictors 320 may be taken as inputs and the method may output a set of functions 310 that should be considered for instrumentation in the next iteration. By definition, a weak predictor 320 is one that is exercised in some failing runs but also exercised in some successful runs. There are two possibilities that need to be taken into account.

1. Weak predictors 320 point to parts of code that may contain stronger predictor 320. This is because the weak predictor 320 interacts with other parts of the program 300 via control and/or data dependencies, caller/callee relationships etc. Often, some of these interactions are more strongly correlated with failure than the predictor 320 itself. For example, the following function may illustrate this relationship.

2. Often, weak predictors 320 may be strengthened by profiling 335 the function 310 containing the weak predictor 320 using richer features. Consider a scenario in which a bug 305 manifests occasionally when a specific edge in the program 300 is traversed. However, the bug 305 manifests almost always when one specific path 310 through this edge is traversed. In such a scenario, if edges are used as features and the function 310 containing the edge is profiled, the method would have found a weak edge predictor. However, if the method refines the features and use paths 310 instead of edges, the method may find a stronger predictor 320. Similarly, if an atomic predicate appears as a weak predictor 320, a stronger predictor 320 may be obtained if the method uses compound predicates. Therefore, when a weak predictor 320

```
1.  void subline(lin, pat, sub)              patsize(pat, n)                     int smatch(lin, offset, pat, j)
2.  {                                           char+ pat;                         char+ lin;
3.    char +lin, +pat, +sub;                    int n;                             int offset;
4.    int i, lastn, n;                      1. {                                   char+ pat;
5.    lastn = –i;                           2.    int size;                        int j;
6.    i = 0;                                3.    if (lin_pat_set(pat[n])) {    1. {
7.    while ((lin[i] != ENDSTR))            4.       ...                        2.    int i, k;
8.    {                                     5.    } else                        3.    bool result, done;
9.      m = smatch(lin, i, pat, o);         6.       switch (pat[n]) {          4.
10.     if ((m >= 0) && (lastm != mi) {     7.          ...                     5.    done = false;
11.       patsub(lin, i, m, sub);           8.          case CLOSURE:           6.    while ((!done) && (pat[j] != ENDSTR])
12.       lastn = m;                        9.             size = CLOSIZE;      7.       if ((pat[j] == CLOSURE)) {
13.     }                                   10.            break ;              8.          j = j + patsize(pat, j);
14.     if ((n == –i) || (m == i)) {                       ...                  9.          i = offset;
        ...                                 13.      }                          10.      while ((!done) && (lin[i] != ENDSTR)) {
22. }                                       14.      return size;               11.         result = omatch(lin, &i, pat, j);
                                            15. }                               12.         if (!result)
                                                                                13.            ...
                                                                                14.      }
                                                                                         ...
                                                                                33. }
```

The above code shows a function 310 subline in the replace benchmark. This function 310 contains a bug on line 9 due to a missing conditional. After boostrapping, the method identifies and profiles 335 a function 310 patsize and finds that one of the paths 310 through patsize (shown in the figure) is a weak bug predictor 320. Further examination of the program 300 reveals that function 310 amatch is one of the functions 310 that interacts with the weak predictor 320 in patsize through a caller-callee relationship at line 8. And one of the paths 310 in amatch (shown in Figure) is a stronger bug predictor 320 because it calls patsize in a restricted context (when pat[j]==CLOSURE). Similarly, this path 310 may be found in amatch where it interacts with the function subline via a caller-callee relationship and the function subline contains an even stronger 310 predictor, which also happens to be the root cause. Static analysis 315 may be used to identify interactions or coupling between weak predictors 320 and other parts of code. As static analysis 325 is conservative, it is possible that a large fraction of the program may be found to be interacting with the predictor 320 and profiling 335 all such interacting functions 310 may be expensive. The method may addresses this problem by quantifying the degree of interaction between a predictor 320 and a function 310 using a custom code coupling measure, which simply counts the number of pairs of (data or control) dependent instructions between the predictor 320 and any given function 310, including dependencies due to function arguments. The method may rank functions 310 based on the degree of coupling and again, selects the top K functions, where K is based on a user-defined threshold.

is found in a function, the method may refine the feature set and mark the function for more detailed profiling 335 in the next iteration.

In conclusion, the method and apparatus uses paths to better identify part of an application that are causing errors. Statistical analysis may be used to predict which path is most likely to be causing errors. The predicted paths may be outfitted or labeled and the bug report may report these labels if they are returned. The method may iterate through a plurality of labeled paths until the path is located that path relates to the error.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of debugging an application, the method comprising: executing the application; collecting errors from the execution of the application in an error report, individual errors in the error report having associated stack traces that include points where the application failed; creating labeled application paths by adding labels to individual application paths, wherein the individual application paths comprise individual loops and individual functions in the application; reviewing the error report for data related to the labels; calculating scores for the individual functions in the application, wherein the scores reflect relative distances of the individual functions from the points where the application failed and the scores further reflect how often the functions appear on the stack traces; and selecting up to a threshold number of the individual functions for profiling based on the scores.

2. The method of claim 1, further comprising selecting the labeled application paths by predicting which of the individual application paths are most likely to cause the errors.

3. The method of claim 1, further comprising selecting the labeled application paths from those individual application paths that are used most frequently.

4. The method of claim 1, further comprising selecting the labeled application paths using statistical analysis to select the individual application paths that are related to the errors.

5. The method according to claim 1, wherein the threshold number is user-defined.

6. The method according to claim 1, wherein the distances from the points where the application failed are based on a number of other functions in the stack trace between the individual functions and the points where the application failed.

7. The method according to claim 1, wherein a first one of the individual functions comprises multiple predicates.

8. The method according to claim 1, further comprising selectively not profiling other individual functions based on the scores.

9. A computer storage medium comprising computer executable instructions for configuring a processor to execute a method of debugging an application, the method comprising: executing the application; collecting errors from the execution of the application in an error report, individual errors in the error report having associated stack traces that include points where the application failed; creating labeled application paths by adding labels to individual application paths, wherein the individual application paths comprise individual loops and individual functions in the application; reviewing the error report for data related to the labels; calculating scores for the individual functions in the application, wherein the scores reflect relative distances of the individual functions from the points where the application failed and the scores further reflect how often the functions appear on the stack traces; and selecting up to a threshold number of the individual functions for profiling based on the scores.

10. The computer storage medium of claim 8, the method further comprising selecting the labeled application paths from those individual application paths that are used most frequently.

11. The computer storage medium according to claim 8, wherein the threshold number is user-defined.

12. The computer storage medium according to claim 8, wherein the distances from the points where the application failed are based on a number of other functions in the stack trace between the individual functions and the points where the application failed.

13. The computer storage medium according to claim 8, wherein a first one of the individual functions comprises multiple predicates.

14. The computer storage medium according to claim 8, the method further comprising selectively not profiling other individual functions based on the scores.

15. A computer system comprising: a processor, a memory and an input/output circuit, the processor being configured in accordance with computer executable instructions for debugging an application, the computer executable instructions comprising instructions for: executing the application; collecting errors from the execution of the application in an error report, individual errors in the error report having associated stack traces that include points where the application failed; creating labeled application paths by adding labels to individual application paths, wherein the individual application paths comprise individual loops and individual functions in the application; reviewing the error report for data related to the labels; calculating scores for the individual functions in the application, wherein the scores reflect relative distances of the individual functions from the points where the application failed and the scores further reflect how often the functions appear on the stack traces; and selecting up to a threshold number of the individual functions for profiling based on the scores.

16. The computer system of claim 15, the computer executable instructions further comprising instructions for selecting the labeled application paths from those individual application paths that are used most frequently.

17. The computer system according to claim 15, wherein the threshold number is user-defined.

18. The computer system according to claim 15, wherein the distances from the points where the application failed are based on a number of other functions in the stack trace between the individual functions and the points where the application failed.

19. The computer system according to claim 15, wherein a first one of the individual functions comprises multiple predicates.

20. The computer system according to claim 15, the computer executable instructions further comprising instructions for selectively not profiling other individual functions based on the scores.

* * * * *